July 13, 1926.
M. DE MARINIS
PLUMBING FITTING
Filed Nov. 11, 1924
1,592,669
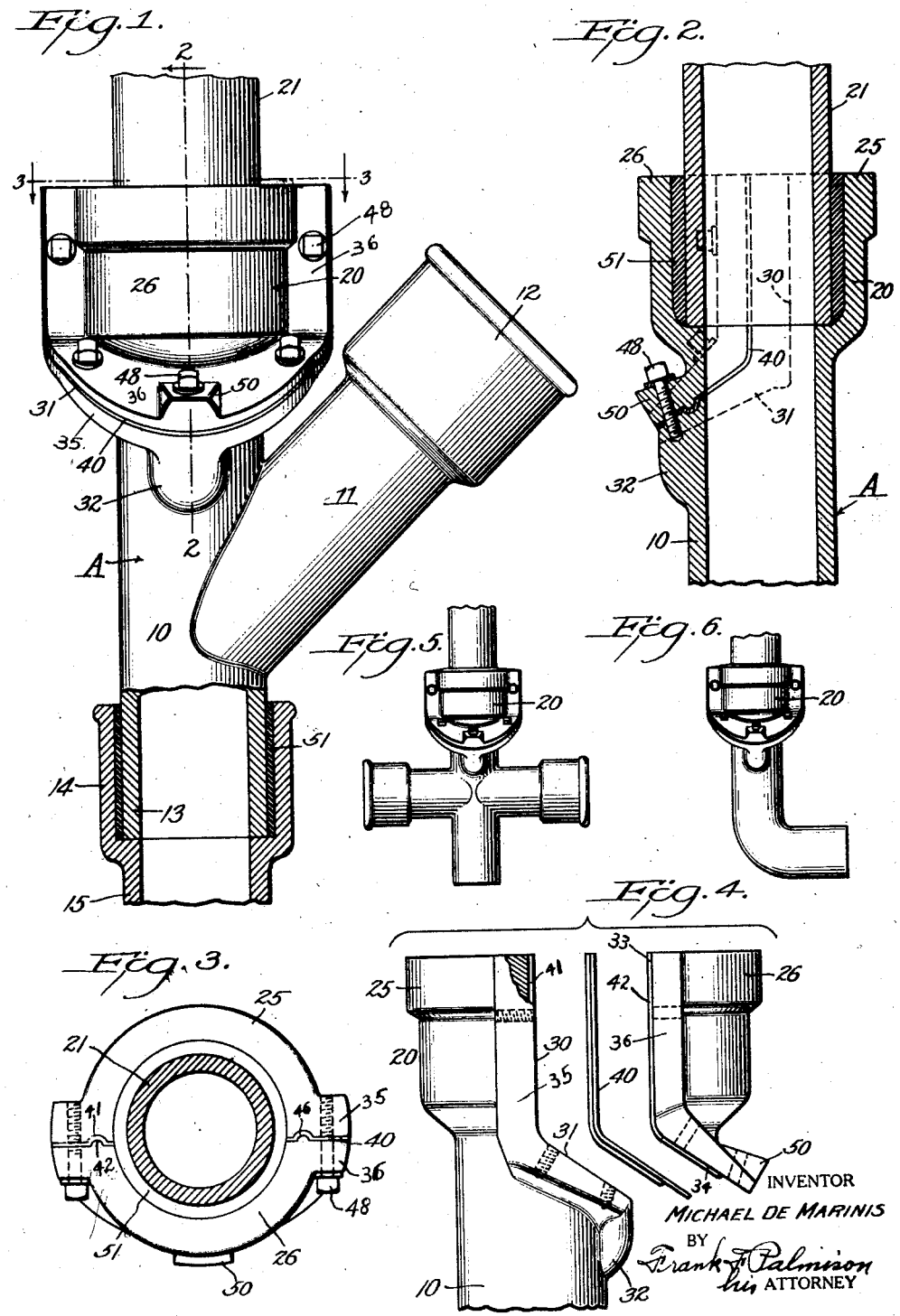
INVENTOR
MICHAEL DE MARINIS
BY
Frank F. Palmison
his ATTORNEY Patented July 13, 1926.

1,592,669

UNITED STATES PATENT OFFICE.

MICHAEL DE MARINIS, OF NEW YORK, N. Y.

PLUMBING FITTING.

Application filed November 11, 1924. Serial No. 749,207.

This invention relates to plumbing fittings and more particularly to sockets for pipes and for fittings employed in pipe lines.

It is an object of the invention that of providing an improved socket or hub for pipes and pipe fittings, which will permit an easy closing or completion of the pipe line, or permit an easy dismemberment of the pipe line, without injuring the same, or permitting an addition thereto of a branch line or lines without any difficulty.

It is another object of the invention that of providing an improved, but simple and efficient socket or hub for plumbing fitting or pipe sections which is cheap to manufacture, and which is admirably useful in the plumbing trade; which is simple in construction, but very sturdy and appropriate for the purpose intended; and which can be employed in the general plumbing trade without in the least changing the standard equipment now in use.

A further object of the invention is that of providing a new and improved socket for pipe line sections, or fittings, which is split in sections and which easily permits the application of such section or fitting to the pipe line.

Further objects and advantages, together with the distinguishing features of the invention will appear as the specification proceeds of which the accompanying drawings form a part; which drawings, it is understood, illustrate but one example or embodiment of the invention, to which I do not limit myself, for the same can be easily changed or varied, without in the least departing from the spirit of my invention.

Referring to the said illustrated embodiment:—

Figure 1 shows one embodiment of the invention as applied to a pipe line, and more particularly to a Y fitting;

Figure 2 shows another embodiment of the invention as applied to a section of a pipe line;

Figure 3 illustrates a view taken on line 3—3 of Figure 1 in the direction of the arrows;

Figure 4 shows a portion of the fitting with its sections separated from each other;

Figure 5 shows another embodiment of the invention as applied to a cross fitting; and Figure 6 shows a further embodiment of the invention as applied to another form of a fitting, such as a pipe turned at an angle.

Plumbers find, with the present standard plumbing equipment for building drainage work, considerable difficulty in closing up or putting in the last pipe section of the drainage pipe, because the end of one section must be inserted in the socket of the next adjacent section. In closing pipe lines the plumber or plumbers make as many as 4 or 5 joints in the neighborhood where the line is closed, so that the end of one portion of the line may be inserted in the socket of the last section in the line by swinging the line and curving the same back and forth until that end enters in its socket. For such swinging and curving it is necessary that the line has as many joints as possible so as to render it more or less flexible under side pressure.

Whenever a pipe line needs to be cleaned plumbers have to resort to cutting the line so as to take out of it one of the sections before the others can be removed. Likewise similar operation must be gone through whenever it is necessary to add to an existing line an auxiliary or a branch line.

Such difficulties and shortcomings are constantly present in the present system, but through the aid of the present invention they are avoided as will hereinafter appear.

Referring to the drawings at A, I have shown a plumbing fitting for drainage pipes commonly known as a Y fitting. This Y fitting comprises the main body 10, the socket or hub 12 on the branch pipe 11, the end 13 of the branch pipe 11, the end 13 forming a part of the main body 10 and adapted to be fitted into the socket or hub 14 of the adjoining pipe section 15. At the upper end of the fitting is located the socket or hub 20 in which fits the lower end of the other adjoining pipe section 21. This socket 20 in all respects serves the same purpose as sockets 12 and 14, but it is constructed different than these latter sockets 13 and 14 as illustrated in the drawings.

As it will be noted from Figures 1 and 3 and 4 the socket 20 is split in two sections, to wit, section 25 and section 26. The section 25 is integral with the main body 10, while the section 26 is removable.

The splitting of the socket is preferably effected on a vertical plane for the length of the socket, and on an inclined plane below the socket forming meeting faces 30 and 31 on the section 25, and meeting faces 33 and 34 on section 26. The meeting face 31 being extended to the reinforcing member 32 which is integral with the body 10 of the pipe.

The sections are formed with integral flanges 35 and 36 respectively. These flanges confirm at their inner faces with each other, and between them is arranged for the purpose of preventing leaking a gasket 40, which gasket may be made of the material suitable for the purpose such as fibre, rubber, or metallic alloy.

The section 25 is formed with a groove 41 which extends substantially the full length of the flange 35. The section 26 is provided with a bead 42 extending the full length of the flange 36, which bead may accommodate itself into the groove 41. From the heretofore description it is seen that by means of the groove 41 and bead 42 the section 26 can easily be alined with the section 25 and act as guiding means for quickly locating the two sections together. The two sections are held together, with the gasket 40 between them, by means of bolts 48 passing through the flanges 35 and 36, the number of which bolts may be varied as the cases may require. In the present illustration there appearing five bolts, but it is clear that any number may be employed. The bolts may screw directly in threaded holes in the flanges or may be provided with nuts. In the illustrated example the screws are threaded in the holes in the flange 35. The gasket 40 is pressed at 46 so as to form a groove at one side and a bead on the other to conform to the bead 42 and to the groove 41.

The section 26 is preferably formed with a comparatively straight member 50 which, as is seen from the illustrations, it is alined with the reinforcing member 32 on the body 10. Both the reinforcing member 32 and the member 50 are formed with alined holes, one of which, the one in the reinforcing enlargement 32, being threaded to receive the threaded lower end of the one of the bolts 48.

So it is seen from the heretofore description that by providing one of the sections of a pipe line, or a fitting thereof, with a split socket or hub, substantially like the one illustrated and described, the line can be easily closed by inserting therein as the last member or component part that section or fitting provided with the split socket. This is accomplished by inserting in the remaining open socket in the line (before the last section is inserted) the end of the section or fitting provided with the split socket, (such as 13) and by drawing toward the end of the other section, yet unclosed in the line (such as 21) so as to partly envelop that end in the section 25. Then the section 26 is locked in its place against the section 25, after the gasket 40 has been arranged on the flange 35, and the bolts 48 inserted in the holes in the flanges 35 and 36 hermetically tightened. Then the space left between the inner face of the split socket and the outer face of the section end surrounded by the said split socket is packed with a filling oakum and lead, as is presently done in plumbing. Such packing of oakum and lead I have designated by the numeral 51.

As it has been mentioned herein the split socket 20 can be formed on any of the fittings generally employed in plumbing. In Figure 5 the split socket 20 has been shown as replacing one of the sockets of a cross fitting; it being plain that any other of the remaining sockets can likewise be replaced by a split socket. In Figure 6 I have shown the socket of a bent section 55 as being replaced by a split socket 20. In both of these figures I have also shown the ends of the sections adjoining the split sockets fitted therein.

I would state in conclusion that while the illustrated and described examples constitute one practical embodiment of my invention, I do not limit myself strictly to the exact details herein illustrated since, manifestly, the same can be considerably varied without departure from the spirit of the invention as defined in the appended claim.

What I claim as my invention is:—

An insertable pipe joint of the bell and spigot type comprising a tubular body, one end of which is enlarged to form a socket or bell designed to receive the spigot end of a succeeding length of pipe, said bell and tubular body being provided with a removable wall section, the plane of division therebetween extending axially through the bell and thence outwardly through the side wall of the tubular body on a transverse plane inclined downwardly from said bell, and intersecting the axial plane at substantially the point where the bell and tubular body portion merge, said body, bell and removable wall section adjacent the meeting edges thereof being provided with outwardly extending flanges, fastening devices cooperating with the flanges for securing the flanges together and a reinforcing enlargement integral with the tubular body and with the tubular body and with the portion of the flange thereof that underlies the central portion of the removable wall section, one of the fastening devices also coacting with the reinforcing enlargement.

In testimony whereof, I have signed my name to this specification this 8th day of November, 1924.

MICHAEL DE MARINIS.